United States Patent [19]

Corte et al.

[11] Patent Number: 5,398,757
[45] Date of Patent: Mar. 21, 1995

[54] MONO-WELL FOR SOIL SPARGING AND SOIL VAPOR EXTRACTION

[75] Inventors: Lawrence J. Corte, Lakewood; Adrian Brown, Denver, both of Colo.

[73] Assignee: K N Energy, Inc., Lakewood, Colo.

[21] Appl. No.: 199,527

[22] Filed: Feb. 22, 1994

[51] Int. Cl.⁶ .................... E21B 43/18; E21B 43/04; B01D 19/00
[52] U.S. Cl. .................... 166/278; 166/228; 166/370; 166/372; 210/170; 210/747
[58] Field of Search .................... 166/278, 276, 305.1, 166/369, 370, 371, 228, 230, 227, 51, 372, 242; 210/170, 747

[56] References Cited

U.S. PATENT DOCUMENTS

| | | | |
|---|---|---|---|
| 2,939,533 | 6/1960 | Coberly | 166/285 X |
| 4,125,159 | 11/1978 | Vann | 166/285 |
| 4,711,306 | 12/1987 | Bobo | 166/372 |
| 4,886,119 | 12/1989 | Bernhardt et al. | 166/267 |
| 5,011,329 | 4/1991 | Nelson et al. | 405/128 |
| 5,032,042 | 7/1991 | Schuring et al. | 405/258 |
| 5,111,883 | 5/1992 | Savery | 166/370 X |
| 5,143,607 | 9/1992 | Bernhardt | 166/278 X |
| 5,180,503 | 1/1993 | Gorelick et al. | 210/758 |
| 5,190,108 | 3/1993 | Mansuy | 166/371 |
| 5,220,958 | 6/1993 | Bernhardt | 166/370 |
| 5,221,159 | 6/1993 | Billings et al. | 405/128 |

OTHER PUBLICATIONS

Uren, L. C., *Petroleum Production Engineering*, Oil Field Development, 4th Ed., McGraw-Hill Book Co., N.Y., pp. 398–401.

*Primary Examiner*—Stephen J. Novosad
*Attorney, Agent, or Firm*—Fields, Lewis, Rost & Smith

[57] ABSTRACT

In accordance with this invention, a well for soil sparging and soil vapor extraction is provided. The well comprises a bore hole extending from the surface of the earth for several feet and preferably to the base of the clay layer. An impervious casing having a larger diameter than the bore hole is mounted concentrically around the bore hole and extends from a point above the surface of the earth to a point below the surface of the earth. The impervious casing is sealed at its top end by a cover plate. An injection tube is inserted into the bore hole wherein the injection tube terminates at a point above the bottom of the bore hole. The bottom most portion of the bore hole is filled with granular material. Above the granular material, the bore hole is filled with packing material that is substantially impervious to liquid and gas. Above the packing material, the remaining space in the bore hole is filled with permeable material which allows passage of gas or liquid. Means is connected to the upper end of the casing for injecting remedial fluid into the injection tube whereby the remedial fluid is introduced into the targeted contaminated soil area. Additionally, means is connected to the upper end of the impervious casing for drawing a vacuum to assist in extraction of volatile contaminants from the surrounding soil through the permeable material. The packing material allows for selectively concentrating remediation at a specified area within the soil.

6 Claims, 1 Drawing Sheet

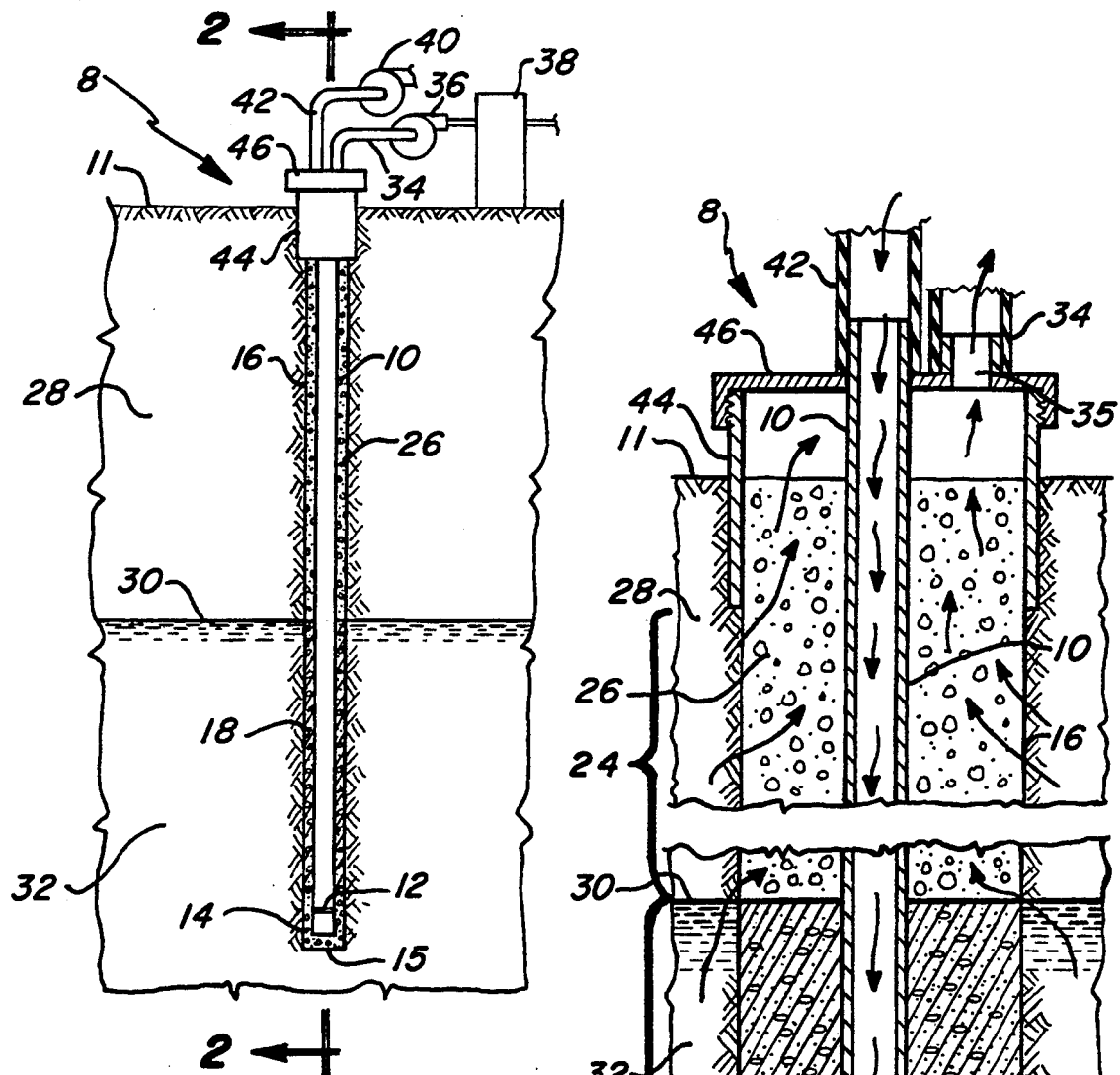
Fig_1
Fig_2

MONO-WELL FOR SOIL SPARGING AND SOIL VAPOR EXTRACTION

TECHNICAL FIELD

This invention relates to a soil sparging and soil vapor extraction apparatus and method, and more particularly to such an apparatus which uses a minimal amount of material and requires a minimal amount of labor to install.

BACKGROUND ART

In recent years, there has been a heightened sense of awareness concerning the need to clean and maintain the environment from contaminants. It has become of paramount importance to clean-up areas of soil that have been exposed to contamination. A number of methods have developed in treating the soil to rid such soil of contaminants, but each method has had definable disadvantages.

One reoccurring problem in soil remediation has been the cost of constructing and maintaining equipment used to decontaminate the soil. Although the methods for clean-up are relatively simple, the equipment used to employ these methods has been traditionally complex and expensive. Accordingly, it is desired that a means for soil remediation be achieved through the most inexpensive and reliable means possible.

For in situ treatment of contaminated soil, common means for remediation require the drilling of numerous wells. Typically, an injection well is accompanied by a separate extraction well for remediation means such as air stripping or vacuum extraction. Some decontamination methods utilize only one well, however, this mono-well concept has previously required complex designs and an exhaustive array of materials.

From the foregoing, it can be seen that a need exists for a technique to decontaminate soil in which a minimum amount of materials and labor are needed. While the prior art may be effective for its intended purpose, such prior art does not present simple yet efficient means for remediation.

For example, U.S. Pat. No. 5,221,159 to Billings et al. is directed to a method and apparatus for removing contaminants from soil and an associated subsurface ground water aquifer. This invention requires two wells, namely, an injection well and adjacent extraction wells that are drilled to a depth above the water table. Oxygenated gas is injected through the injection well while a vacuum is applied to the extraction well. Contaminants are removed from the ground water aquifer and from the vadose zone by a combination of physical, chemical and biochemical processes. Relatively pure liquid contaminant may be extracted simultaneously with cleansing of the soil above the aquifer. Microbes natural to the contaminated site are extracted, analyzed, fermented and reintroduced into the soil to enhance biodegration.

U.S. Pat. No. 5,180,503 to Gorelick et al. is directed to an in-situ method and apparatus for removing volatile organic compounds from ground water. The technique includes gas-lift pumping and in-situ vapor stripping. The apparatus includes means for injecting a gas into a well to force ground water flow towards the well and to cause volatile compounds to be transferred from the ground water to rising gas bubbles inside the well. The apparatus further includes means at the top of the well for collecting vapor contained within the gas bubbles. Injection of air is provided through an air line below the water table to a saturated zone containing the contaminants. The contaminants are drawn in through a well screen and rise through a well casing which surrounds the air line.

U.S. Pat. No. 5,032,042 to Schuring et al. discloses a system for eliminating contaminants from the soil and creating a fracturing assembly for pneumatically fracturing the soil. The fracturing assembly includes a probe which is inserted into a well and which receives pressurized gas. First and second packers press against the well so as to provide a sealed area in the well. Pressurized gas is applied through a nozzle including at least one orifice therein. Fracturing of the soil allows for conductive channels to be created which permits more rapid movement of contaminants through the soil. The pressurized gas travels through the fractures created in the soil and a transformation means is provided such that liquid toxic contaminants in the soil are vaporized.

U.S. Pat. No. 5,011,329 to Nelson et al. is directed to a method and apparatus for in-situ decontamination of soil. Hot gas is injected into bore holes formed in a contaminated soil area to vaporize the soil moisture and contaminants, and for collecting the vaporized contaminants at the surface of the soil. A burner heats pressurized gases and mixes the same with the combustion gases for injection into the contaminated zone. A central collection system recovers the vaporized contaminants and couples such vapors to an on-site incinerator for disposal.

U.S. Pat. No. 4,711,306 to Bobo is directed to a method for decontaminating soil wherein a gas lift system is used. Pressurized injection gas is mixed with pressurized injection liquid prior to introducing the pressurized mixture into a bore hole. The pressurized injection gas and liquid mixture is introduced into one portion of the well bore to a point below an initial column of well fluid present in another portion of the well bore conduit. As the mixture of injection gas and liquid travels toward the bottom of the well bore, the gas is compressed increasingly by the height of the column of liquid thereabove and is subsequently passed to another portion of the well bore where the gas rises and expands to lift oil or other contaminant fluids to the surface.

U.S. Pat. No. 4,886,119 to Bernhardt et al. is directed to a method for driving volatile impurities from the ground wherein a bore hole is provided with a central shaft whose upper end is sealed from the outside by a plate. A first non-perforated suction pipe extends in the drilling shaft to the proximate end of the shaft. A second suction pipe concentrically surrounds the first suction pipe, with a space therebetween, and extends to half the length of the drilling shaft. The inner ends of both pipes form suction locations. The ends of the suction pipes extend outside of the shaft in a fluid separating chamber. Means for drawing a vacuum is provided at the upper end of the drilling shaft. Sieve ring bodies are arranged at the ends of the suction pipes, each of which has a flexible sieve wall which can be composed of metal sieve web or synthetic plastic sieve web. The upper part of the shaft is supported by loose aggregate material.

While each of the inventions described above fulfills its intended purpose, each structure is somewhat complex and therefore expensive to provide and requires significant labor for installation. Another disadvantage of these inventions is that the injection fluid cannot be selectively placed in the desired area of the soil without either changing the depth of the well or position of the injection tube.

DISCLOSURE OF THE INVENTION

In accordance with this invention, a soil sparging and soil vapor extraction apparatus and method of construction is provided. The well comprises a bore hole extending from the surface of the earth for several feet into the earth and preferably to the base of a clay layer or zone for compaction of higher bulk density than the underlying vadose zone. An impervious casing having a larger diameter than the bore hole is mounted concentrically around the bore hole and extends from a point above the surface of the earth to a level below the surface of the earth. The casing portion above the surface of the earth is sealed by a cover plate. An injection tube is placed through the interior of the bore hole. The injection tube extends from a point above the surface of the earth to a point just above the bottom most point of the well. A screen is attached to the end of the injection tube at the bottom of the well. Gravel or granular material fills the bore hole around the screen and bottom portion of the injection tube. The depth of the gravel or granular material in the bore hole needs to be deep enough to completely surround the screen and an additional length of injection tube above the screen. In the bore hole above the gravel or granular material lies packing material which is substantially impervious to gas or liquid. The packing material fills the bore hole up to a predetermined location, typically, to a point near the water table. In the bore hole above the packing material is placed permeable material such as gravel. This permeable material fills the remaining portion of the bore hole. Above the surface of the well and attached in line with the injection tube is a injection conduit which in turn connects with a injection pump. The injection conduit travels through the cover plate and connects with the injection tube at a point above the surface of the earth.

An extraction conduit terminates at the cover plate having an open end which extends through the cover plate. The extraction conduit at its opposite end is attached to a vacuum pump. The vacuum pump is then connected to a treatment system whereby captured contaminants may be treated for prudent disposal.

The structure just described is very simple, requiring a minimum amount of materials. The injection tube, casing, cover plate, injection conduit, and extraction conduit can all be made of well-known materials such as pipe and steel plate. The gravel and permeable material placed inside the bore hole can be common aggregate. The packing material may comprise of clay, concrete, or any other common construction material that is substantially impermeable to gas or liquid. The packing material can be selectively placed at the desired depth in the ground to ensure that remediation takes place at a targeted point in the surrounding contaminated soil. In the event there exists wet or other highly dense soil surrounding the well at the point of desired remediation, the packing material prevents the remedial fluid from reentering the well at that point thus achieving the desired remedial effect. Despite the simplicity of construction, this well is as effective as the prior art wells which are much more complex and costly to construct.

Further advantages of this invention will become apparent from the description which follows, taken in conjunction with the accompanying drawings.

BRIEF DESCRIPTION OF THE DRAWINGS

FIG. 1 is a fragmentary vertical section through the earth showing a well constructed in accordance with this invention; and FIG. 2 is an enlarged, fragmentary vertical section, showing further details of the construction of the well.

BEST MODE FOR CARRYING OUT THE INVENTION

As best seen in FIG. 1, a well 8 is placed so as to extend into a volatile contaminated zone 32. As shown, the well 8 comprises a bore hole 16 extending downwardly from the surface 11 of the earth through the vadose zone 28 to the zone 32 below the water table 30. The top of the bore hole 16 is surrounded by concentric casing 44 with a cover plate 46 which caps the top portion of casing 44. The top of the well includes an extraction conduit 34 having a first end connected to an outlet 35 (shown in FIG. 2) in cover plate 46 and a second end connected to a vacuum pump 36 which draws a vacuum in the well so that volatile contaminants move into the permeable material 26 and further through the bore hole 16 to be evacuated through the extraction conduit 34. Once leaving the vacuum pump 36, the contaminates travel to a treatment system 38 whereby the contaminates may be treated in accordance with prudent environmental practices. The top of the well further comprises an injection conduit 42 which is connected in line with an injection tube 10 which extends through the length of the bore hole 16. The injection conduit 42 above the well is connected to an injection pump 40. Fluid is forced by the pump 40 into the conduit 42 and through the tube 10. The injection tube 10 terminates at its lower end with a screen 12 attached. The screen is located just above the bottom surface 15 of the bore hole 16. Gravel or granular material 14 is packed around the screen 12 and the lower portion of the injection tube 10. Above the gravel or granular material 14 in the bore hole is packing material 18. The packing material is substantially impermeable to gas and liquid. This packing material extends from the gravel or granular material 14 to a point near the top surface of the water table 30. Although the packing material is shown as positioned near the water table, the material may be placed at any location along the depth by the well. The packing material 18 may typically comprise of bentonite, cement, clay, or other common construction material. Inside the bore hole just above the packing material 18 is permeable material 26. The permeable material 26 may comprise of gravel or any other suitable material which allows liquid and gas to permeate, but such material must also have enough compressive resistance to maintain the shape of the bore hole 16.

The operation of well 8 can best be understood by referring to FIG. 2. First, the injection pump 40 (shown in FIG. 1) injects a fluid, which may be a liquid or gas. Typically, air or other remedial fluid is injected at the same level or below the level of contaminates in the soil. This injection occurs through the injection conduit 42 and injection tube 10. The injected fluid then passes through the screen 12 and through the gravel or other granular material 14. The fluid next passes through the injection zone 20 into the surrounding contaminated zone 32 and moves away from the bore hole 16 under the pressure created by the injection pump 40. Once the injected fluid comes in contact with the contaminates, volatilization and/or biological or chemical reactions take place. The fluid then picks up the contaminates and moves them to the surface of the earth due to buoyancy and as a result of the pressure gradient created by the injection pump. The contaminant laden fluid passes outside of packing material 18 of packing zone 22 as depicted by directional arrows 29, into the vadose zone 28. The pressure differential between the soil in the vadose zone 28 and the permeable material 26 within the bore hole 16 causes the contaminant laden fluid to enter back into the bore hole through the soil vapor fluid extraction zone 24 where the permeable material 26 is located. The contaminate laden fluid then continues to move to the surface of the earth 11 through the permeable material 26 in the bore hole 16. The vacuum drawn by the vacuum pump 36 (shown in FIG. 1), assists in evacuation of the contaminant laden fluid.

Referring back to FIG. 1, the contaminant laden fluid next passes through the extraction conduit 34 and vacuum pump 36 to the treatment system 38 whereby contaminants are treated in an environmentally prudent manner.

It will be understood that the depth of the bore hole can be dug to any depth necessary to reach the area of contaminated soil. Although the figures depict contaminants below the vadose zone, this invention may also be used to remove contaminants in the vadose zone.

By this invention, an inexpensive well has been provided both with respect to the materials used and with respect to the labor involved in its construction. Furthermore, this invention allows remediation to be concentrated at a selected level within the soil through use of the substantially impervious packing material.

This invention has been described in detail with reference to a particular embodiment thereof, but it will be understood that various other modifications can be effected within the spirit and scope of this invention.

We claim:

1. A well for soil sparging and soil vapor extraction to remove volatile contaminants from in-situ soil, said well comprising:
   a bore hole having side edges extending from the surface of the earth to a depth below said surface of the earth forming a bore hole space;
   an impervious casing having a larger diameter than said bore hole mounted concentrically around said bore hole and extending from a point above the surface of the earth to a point below the surface of the earth;
   granular material filling the space in the bottom most portion of said bore hole space to provide permeable passage of liquid;
   packing material filling a portion of said bore hole space above the granular material wherein said packing material is substantially impervious to gas or liquid;
   permeable material filing remaining upper bore hole space above the packing material whereby said permeable material allows passage of gas or liquid;
   an injection tube having a top end and terminal end wherein said terminal end is inserted into the bore hole through and in contact with said permeable material, said packing material and said granular material so that gas or liquid may be introduced into a targeted contaminated soil area;
   a cover plate sealing a top surface of said impervious casing whereby an air tight seal is achieved between said cover plate and top surface of said impervious casing;
   means connected to the top surface of said impervious casing for injecting remedial fluid into said injection tube whereby said fluid is injected into the targeted contaminated soil area; and
   means connected to the top surface of said impervious casing for drawing a vacuum in said bore hole to assist in extraction of volatile contaminants from the targeted contaminated soil area through said permeable material and said casing.

2. An apparatus, as claimed in claim 1, further comprising:
   a screen attached to said injection tube at the terminal end.

3. An apparatus, as claimed in claim 1, further comprising:
   a disposal means operatively attached to said vacuum means whereby extracted contaminants are treated in an environmentally prudent manner.

4. An apparatus, as claimed in claim 1, wherein:
   said impervious casing is made of steel.

5. A method of decontaminating in-situ soil, said method comprising the steps of:
   drilling a bore hole from the surface of the earth to a depth below the surface of the earth to a depth to reach a targeted contaminated soil area;
   mounting an impervious casing whose diameter is greater than the bore hole concentrically outside the bore hole;
   inserting an injection tube within the bore hole to a depth where remedial fluid may be injected into the targeted contaminated soil area;
   filling a bottom area of the bore hole with granular material;
   filling a middle area of the bore hole above the bottom area with packing material that is substantially impervious to gas or liquid;
   filling a remaining upper area of the bore hole with permeable material whereby gas and liquid may pass;
   sealing said impervious casing with respect to the surface of the earth whereby an airtight seal is achieved;
   injecting remedial fluid through the injection tube wherein the remedial fluid is forced through the bottom area of the bore hole and into the surrounding targeted contaminated soil, the injected remedial fluid percolating upwards and outwardly around the middle area of the bore hole and through the contaminated soil; and
   drawing the remedial fluid back into the bore hole at the upper area of the bore hole located above the middle area and then through an outlet.

6. A method of decontaminating in-situ soil, said method comprising the steps of:
   providing a bore hole having an insertable injection tube;
   filling the bore hole at the bottom with granular material;
   filling the bore hole above the granular material with packing material substantially impervious to gas or liquid;
   filling the remaining upper portion of the bore hole above the packing material with permeable material;
   injecting remedial fluid through the injection tube so that the fluid passes through the granular material at the bottom of the bore hole, then upwardly around the exterior periphery of the packing material;
   drawing the remedial fluid back into the bore hole through the permeable material; and
   removing the remedial fluid from the bore hole for treatment.

* * * * *